US012137328B2

(12) United States Patent
Vilermo et al.

(10) Patent No.: US 12,137,328 B2
(45) Date of Patent: Nov. 5, 2024

(54) APPARATUS, METHODS AND COMPUTER PROGRAMS FOR CONTROLLING NOISE REDUCTION

(71) Applicant: Nokia Technologies Oy, Espoo (FI)

(72) Inventors: Miikka Vilermo, Siuro (FI); Jorma Makinen, Tampere (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 522 days.

(21) Appl. No.: 17/413,009

(22) PCT Filed: Dec. 13, 2019

(86) PCT No.: PCT/FI2019/050890
§ 371 (c)(1),
(2) Date: Jun. 11, 2021

(87) PCT Pub. No.: WO2020/128153
PCT Pub. Date: Jun. 25, 2020

(65) Prior Publication Data

US 2022/0021970 A1 Jan. 20, 2022

(30) Foreign Application Priority Data

Dec. 20, 2018 (GB) ...................................... 1820808

(51) Int. Cl.
*H04R 3/00* (2006.01)

(52) U.S. Cl.
CPC ......... *H04R 3/005* (2013.01); *H04R 2410/01* (2013.01); *H04R 2410/07* (2013.01)

(58) Field of Classification Search
CPC . H04R 3/005; H04R 2410/01; H04R 2410/07
USPC ............................................................ 381/92
See application file for complete search history.

(56) References Cited

U.S. PATENT DOCUMENTS

| | | | | |
|---|---|---|---|---|
| 2005/0203735 | A1 | 9/2005 | Ichikawa | 704/226 |
| 2007/0258607 | A1 * | 11/2007 | Purnhagen | G10L 19/0204 381/307 |
| 2012/0130713 | A1 | 5/2012 | Shin et al. | 704/233 |
| 2012/0284023 | A1 | 11/2012 | Vitte et al. | 704/233 |
| 2013/0142338 | A1 * | 6/2013 | Chang | H04S 5/005 381/17 |
| 2013/0236022 | A1 * | 9/2013 | Virette | G10L 21/0364 381/22 |
| 2015/0142427 | A1 | 5/2015 | Tenentiv et al. | |
| 2017/0353809 | A1 | 12/2017 | Zhang et al. | 29/8 |

(Continued)

*Primary Examiner* — Sean H Nguyen
(74) *Attorney, Agent, or Firm* — Harrington & Smith

(57) ABSTRACT

Examples of the disclosure relate to apparatus, methods and computer programs for controlling noise reduction in audio signals including audio captured by a plurality of microphones. The apparatus includes circuitry for obtaining one or more audio signals wherein the one or more audio signals include audio captured by a plurality of microphones and dividing the obtained one or more audio signals into a plurality of intervals. The circuitry may also be configured for determining one or more parameters relating to one or more noise characteristics for different intervals and controlling noise reduction applied to the different intervals based on the determined one or more parameters within the different intervals.

21 Claims, 5 Drawing Sheets

(56) References Cited

U.S. PATENT DOCUMENTS

| | | | | |
|---|---|---|---|---|
| 2018/0084358 | A1 | 3/2018 | Tisch et al. | 29/5 |
| 2018/0122399 | A1 | 5/2018 | Janse et al. | |

* cited by examiner

APPARATUS, METHODS AND COMPUTER PROGRAMS FOR CONTROLLING NOISE REDUCTION

CROSS REFERENCE TO RELATED APPLICATION

This patent application is a U.S. National Stage application of International Patent Application Number PCT/FI2019/050890 filed Dec. 13, 2019, which is hereby incorporated by reference in its entirety, and claims priority to GB 1820808.2 filed Dec. 20, 2018.

TECHNOLOGICAL FIELD

Examples of the present disclosure relate to apparatus, methods and computer programs for controlling noise reduction. Some relate to apparatus, methods and computer programs for controlling noise reduction in audio signals comprising audio captured by a plurality of microphones.

BACKGROUND

Audio signals comprising audio captured by a plurality of microphones can be used to provide spatial audio signals to a user. The quality of these signals can be adversely affected by unwanted noise captured by the plurality of microphones.

BRIEF SUMMARY

According to various, but not necessarily all, examples of the disclosure there is provided an apparatus comprising means for: obtaining one or more audio signals wherein the one or more audio signals comprise audio captured by a plurality of microphones; dividing the obtained one or more audio signals into a plurality of intervals; determining one or more parameters relating to one or more noise characteristics for different intervals; and controlling noise reduction applied to the different intervals based on the determined one or more parameters within the different intervals.

The intervals may comprise time-frequency intervals.

The noise characteristics may comprise noise levels.

The parameters relating to one or more noise characteristics may be determined independently for the different intervals.

Determining one or more parameters relating to one or more noise characteristics may comprise determining whether or not the one or more parameters are within a threshold range.

Different thresholds for the one or more parameters relating to noise characteristics may be used for different frequency ranges within the plurality of intervals.

The one or more parameters relating to one or more noise characteristics may comprise one or more of, noise level in an interval, noise levels in intervals preceding an analysed interval, methods of noise reduction used for previous frequency interval, duration for which a current method of noise reduction has been used within a frequency band, orientation of the microphones that capture the one or more audio signals.

The noise reduction applied to a first interval may be independent of the noise reduction applied to a second interval wherein the first and second intervals have different frequencies but overlapping times.

Different noise reduction may be applied to different intervals where the different intervals have different frequencies but overlapping times.

Controlling the noise reduction applied to an interval may comprise selecting a method used for noise reduction within the interval.

Controlling the noise reduction applied to an interval may comprise determining when to switch between different methods used for noise reduction within one or more intervals.

Controlling the noise reduction applied to an interval may comprise one or more of; providing a noise reduced spatial output, providing a spatial output with no noise reduction, providing a noise reduced mono audio output, providing a beamformed output, providing a noise reduced beamformed output.

The noise that is reduced may comprise noise that has been detected by one or more of the plurality of microphones that capture audio within the one or more audio signals.

The noise may comprise one or more of, wind noise, handling noises.

According to various, but not necessarily all, examples of the disclosure there is provided an apparatus comprising: processing circuitry; and memory circuitry including computer program code, the memory circuitry and the computer program code configured to, with the processing circuitry, cause the apparatus to: obtain one or more audio signals wherein the one or more audio signals comprise audio captured by a plurality of microphones; divide the obtained one or more audio signals into a plurality of intervals; determine one or more parameters relating to one or more noise characteristics for different intervals; and control noise reduction applied to the different intervals based on the determined one or more parameters within the different intervals.

According to various, but not necessarily all, examples of the disclosure there is provided an electronic device comprising an apparatus as described above and a plurality of microphones.

The electronic device may comprise a communication device.

According to various, but not necessarily all, examples of the disclosure there is provided a method comprising: obtaining one or more audio signals wherein the one or more audio signals comprise audio captured by a plurality of microphones; dividing the obtained one or more audio signals into a plurality of intervals; determining one or more parameters relating to one or more noise characteristics for different intervals; and controlling noise reduction applied to the different intervals based on the determined one or more parameters within the different intervals.

The parameters relating to one or more noise characteristics may be determined independently for the different intervals.

According to various, but not necessarily all, examples of the disclosure there is provided a computer program comprising computer program instructions that, when executed by processing circuitry, cause: obtaining one or more audio signals wherein the one or more audio signals comprise audio captured by a plurality of microphones; dividing the obtained one or more audio signals into a plurality of intervals; determining one or more parameters relating to one or more noise characteristics for different intervals; and controlling noise reduction applied to the different intervals based on the determined one or more parameters within the different intervals.

The parameters relating to one or more noise characteristics may be determined independently for the different intervals.

According to various, but not necessarily all, examples of the disclosure there is provided an apparatus comprising means for: obtaining one or more audio signals wherein the one or more audio signals comprise audio captured by a plurality of microphones; dividing the obtained one or more audio signals into a plurality of intervals; determining one or more parameters relating to one or more noise characteristics for different intervals; and determining whether to provide mono audio output or spatial audio output based on the determined one or more parameters.

The intervals may comprise time-frequency intervals.

The noise characteristics may comprise noise levels.

Providing a mono audio output may comprise determining a microphone signal that has the least noise and using the determined microphone signal to provide the mono audio output.

Providing a mono audio output may comprise combining microphone signals from two or more of the plurality of microphones wherein the two or more of the plurality of microphones are located close to each other.

The spatial audio output may comprise one or more of; stereo signal, binaural signal, Ambisonic signal.

Determining one or more parameters relating to one or more noise characteristics for different intervals may comprise determining whether energy differences between microphone signals from different microphones within the plurality of microphones are within a threshold range.

Determining one or more parameters relating to one or more noise characteristics for different intervals may comprise determining whether a switch between mono audio output and spatial audio output has been made within a threshold time.

Different threshold ranges may be used for different frequency bands.

The mono audio output may be provided for a first frequency band within the intervals and the spatial audio output may be provided for a second frequency band within the intervals wherein the first and second intervals have different frequencies but overlapping times.

According to various, but not necessarily all, examples of the disclosure there is provided an apparatus comprising: processing circuitry; and memory circuitry including computer program code, the memory circuitry and the computer program code configured to, with the processing circuitry, cause the apparatus to: obtain one or more audio signals wherein the one or more audio signals comprise audio captured by a plurality of microphones; divide the obtained one or more audio signals into a plurality of intervals; determine one or more parameters relating to one or more noise characteristics for different intervals; and determining whether to provide mono audio output or spatial audio output based on the determined one or more parameters.

According to various, but not necessarily all, examples of the disclosure there is provided an electronic device comprising an apparatus described above and a plurality of microphones.

The electronic device may comprise a communication device.

According to various, but not necessarily all, examples of the disclosure there is provided a method comprising: obtaining one or more audio signals wherein the one or more audio signals comprise audio captured by a plurality of microphones; dividing the obtained one or more audio signals into a plurality of intervals; determining one or more parameters relating to one or more noise characteristics for different intervals; and controlling noise reduction applied to the different intervals based on the determined one or more parameters within the different intervals.

Providing a mono audio output may comprise determining a microphone signal that has the least noise and using the determined microphone signal to provide the mono audio output.

According to various, but not necessarily all, examples of the disclosure there is provided a computer program comprising computer program instructions that, when executed by processing circuitry, cause: obtaining one or more audio signals wherein the one or more audio signals comprise audio captured by a plurality of microphones; dividing the obtained one or more audio signals into a plurality of intervals; determining one or more parameters relating to one or more noise characteristics for different intervals; and controlling noise reduction applied to the different intervals based on the determined one or more parameters within the different intervals.

Providing a mono audio output may comprise determining a microphone signal that has the least noise and using the determined microphone signal to provide the mono audio output.

BRIEF DESCRIPTION

Some example embodiments will now be described with reference to the accompanying drawings in which.

DETAILED DESCRIPTION

Figure 1:
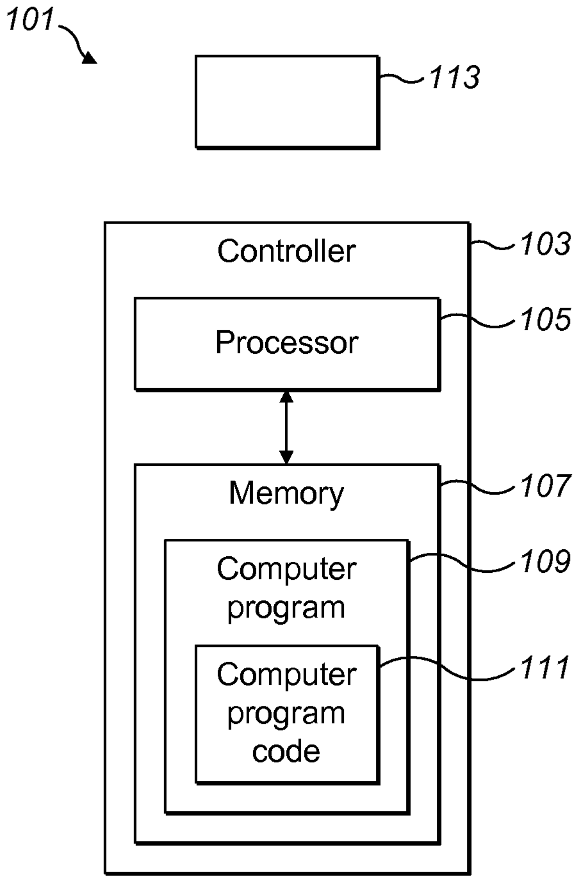
FIG. 1 illustrates an example apparatus.

Examples of the disclosure relate to apparatus 101, methods and computer programs for controlling noise reduction in audio signals comprising audio captured by a plurality of microphones. The apparatus 101 comprises means for obtaining 301 one or more audio signals wherein the one or more audio signals comprise audio captured by a plurality of microphones 203 and dividing 303 the obtained one or more audio signals into a plurality of intervals. The means may also be configured for determining 305 one or more parameters relating to one or more noise characteristics for different intervals and controlling 307 noise reduction applied to the different intervals based on the determined one or more parameters within the different intervals.

The apparatus 101 may therefore enable different methods of noise reduction to be applied for different intervals within the obtained audio signals. This can take into account differences in the perceptibility of the noise in different frequency bands, the perceptibility of switching between different methods of noise reduction in different frequency bands and any other suitable factors so as to improve the perceived quality of the output signal.

FIG. 1 schematically illustrates an apparatus 101 according to examples of the disclosure. In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 3, 4, 5 and 7. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: obtaining 301 one or more audio signals wherein the one or more audio signals comprise audio captured by a plurality of microphones; dividing 303 the obtained one or more audio signals into a plurality of intervals; determining 305 one or more parameters relating to one or more noise characteristics for different intervals; and controlling 307 noise reduction applied to the different intervals based on the determined one or more parameters within the different intervals.

In some examples the apparatus 101 may comprise at least one processor 105; and at least one memory 107 including computer program code 111, the at least one memory 107 and the computer program code 111 configured to, with the at least one processor 105, cause the apparatus 101 at least to perform: obtaining 501 one or more audio signals wherein the one or more audio signals comprise audio captured by a plurality of microphones 203; dividing 503 the obtained one or more audio signals into a plurality of intervals; determining 505 one or more parameters relating to one or more noise characteristics for different intervals; and determining 507 whether to provide mono audio output or spatial audio output based on the determined one or more parameters.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: obtaining 301 one or more audio signals wherein the one or more audio signals comprise audio captured by a plurality of microphones 203; dividing 303 the obtained one or more audio signals into a plurality of intervals; determining 305 one or more parameters relating to one or more noise characteristics for different intervals; and controlling 307 noise reduction applied to the different intervals based on the determined one or more parameters within the different intervals.

In some examples the computer program 109 comprises computer program instructions for causing an apparatus 101 to perform at least the following: obtaining 501 one or more audio signals wherein the one or more audio signals comprise audio captured by a plurality of microphones 203; dividing 503 the obtained one or more audio signals into a plurality of intervals; determining 505 one or more parameters relating to one or more noise characteristics for different intervals; and determining 507 whether to provide mono audio output or spatial audio output based on the determined one or more parameters.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to “computer-readable storage medium”, “computer program product”, “tangibly embodied computer program” etc. or a “controller”, “computer”, “processor” etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term “circuitry” may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2:
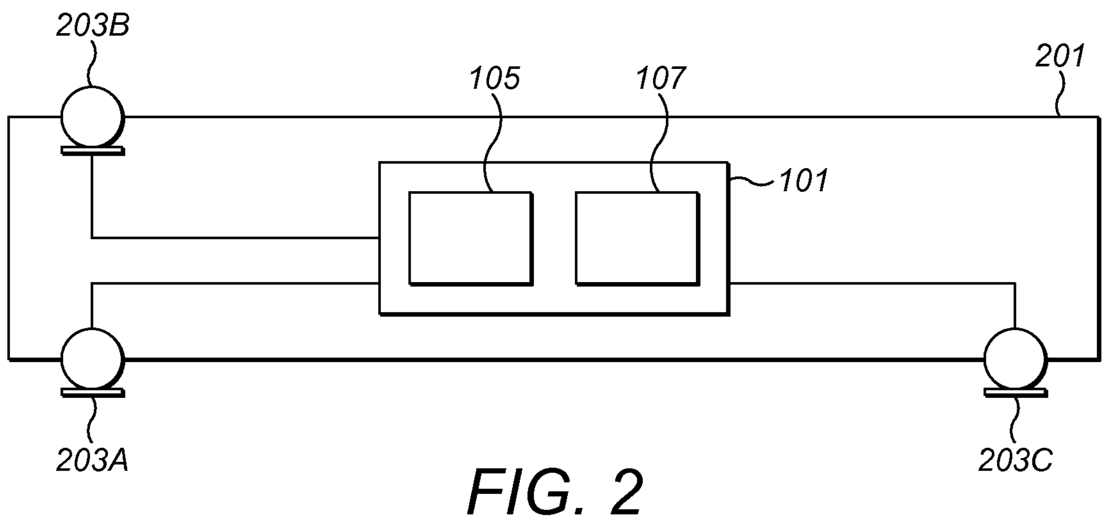
FIG. 2 illustrates an example electronic device.

FIG. 2 illustrates an example electronic device 201. The example electronic device 201 comprises an apparatus 101 which may be as shown in FIG. 1. The apparatus 101 may comprise a processor 105 and memory 107 as described above. The example electronic device also comprises a plurality of microphones 203.

The electronic device 201 could be a communications device such as a mobile phone. It is to be appreciated that the communications device could comprise components that are not shown in FIG. 2 for examples the communications devices could comprise one or more transceivers which enable wireless communication.

In some examples the electronic device 201 could be an image capturing device. In such examples the electronic device 201 could comprise one or more cameras which may enable images to be captured. The images could be video images, still images or any other suitable type of images. The images that are captured by the camera module may accompany the audio that is captured by the plurality of microphones 203.

The plurality of microphones 203 may comprise any means which are configured to capture sound and enable an audio signal to be provided. The audio signals may comprise an electrical signal that represents at least some of the sound field captured by the plurality of microphones 203. The output signals provided by the microphones 203 may be modified so as to provide the audio signals. For example the output signals from the microphones 203 may be filtered or equalized or have any other suitable processing performed on them.

The electronic device 201 is configured so that the audio signals comprising audio from the plurality of microphones 203 are provided to the apparatus 101. This enables the apparatus 101 to process the audio signals. In some examples it may enable the apparatus 101 to process the audio signals so as to reduce the effects of noise captured by the microphones 203.

The plurality of microphones 203 may be positioned within the electronic device 201 so as to enable spatial audio to be captured. For example the positions of the plurality of microphones 203 may be distributed through the electronic device 201 so as to enable spatial audio to be captured. The spatial audio comprises one or more audio signals which can be rendered so that a user of the electronic device 201 can perceive spatial properties of the one or more audio signals. For example the spatial audio may be rendered so that a user can perceive the direction of origin and the distance from an audio source.

In the example shown in FIG. 2 the electronic device 201 comprises three microphones 203. A first microphone 203A is provided at a first end on a first surface of the electronic device 201. A second microphone 203B is provided at the first end on a second surface of the electronic device 201. The second surface is on an opposite side of the electronic device 201 to the first surface. A third microphone 203C is provided at a second end of the electronic device 201. The second end is an opposite end of the electronic device 201 to the first end. The third microphone 203C is provided on the same surface as the first microphone 203A. It is to be appreciated that other configurations of the plurality of microphones 203 may be provided in other examples of the disclosure. Also in other examples the electronic device 201 could comprise a different number of microphones 203. For instance the electronic device 201 could comprise two microphones 203 or could comprise more than three microphones 203.

The plurality of microphones 203 are coupled to the apparatus 101. This may enable the signals that are captured by the plurality of microphones 203 to be provided to the apparatus 101. This may enable the audio signals comprising audio captured by the microphones 203 to be stored in the memory 107. This may also enable the processor 105 to perform noise reduction on the obtained audio signals. Example methods for noise reduction are shown in FIGS. 3 and 4.

In the example shown in FIG. 2 the microphones 203 that capture the audio and the processor 105 that performs the noise reduction are provided within the same electronic device 201. In other examples the microphones 203 and the processor 105 that performs noise reduction could be provided in different electronic devices 201. For instance the audio signals could be transmitted from the plurality of microphones 203 to a processing device via a wireless connection, or some other suitable communication link.

Figure 3:
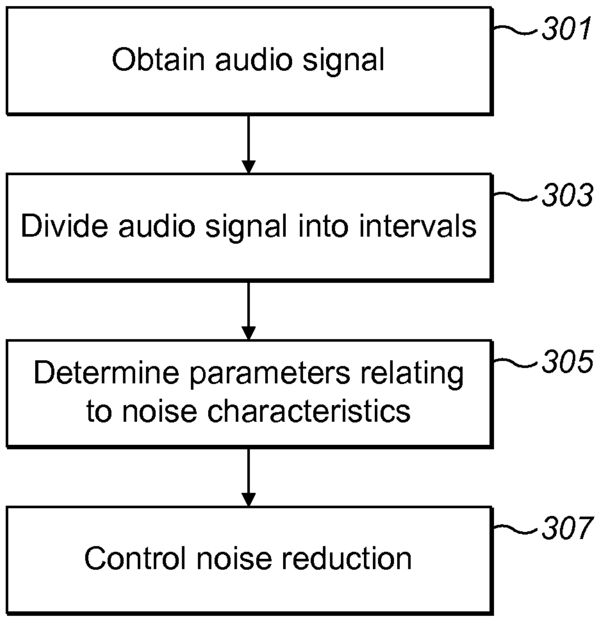
FIG. 3 illustrates an example method.
Figure 4:
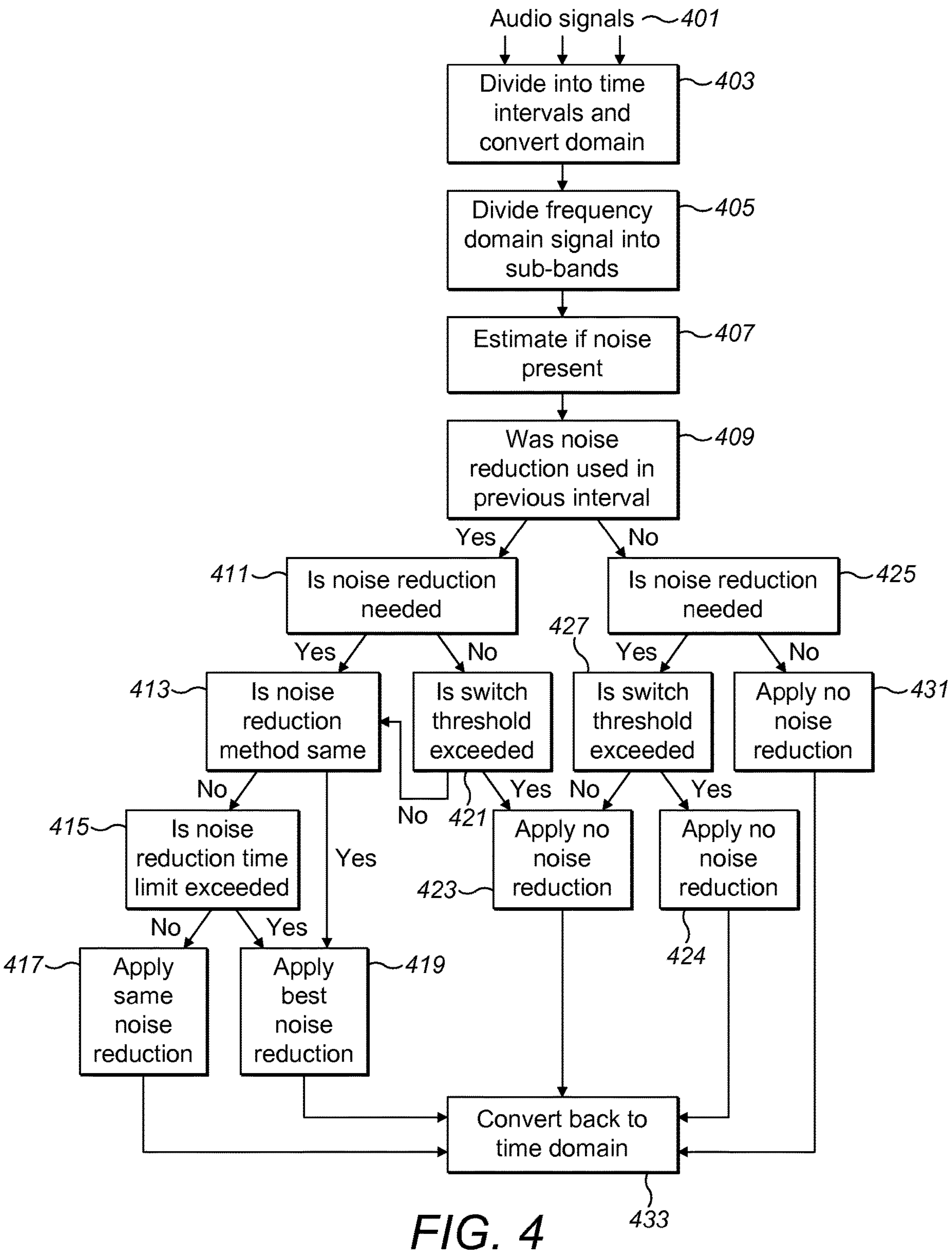
FIG. 4 illustrates another example method.

FIG. 3 illustrates an example method of controlling noise reduction. The method may be implemented using an apparatus 101 as shown in FIG. 1 and/or an electronic device 201 as shown in FIG. 2.

The method comprises, at block 301, obtaining one or more audio signals wherein the one or more audio signals represent sound signals captured by a plurality of microphones 203. In some examples the one or more audio signals comprise audio obtained from microphones 203 that are provided within the same electronic device 201 as the apparatus 101. In other examples the one or more audio signals could comprise audio obtained from microphones 203 that are provided in one or more separate devices. In such examples the audio signals could be transmitted to the apparatus 101.

The one or more audio signals that are obtained may comprise an electrical signal that represents at least some of a sound field captured by the plurality of microphones 203. The output signals provided by the microphones 203 may be modified so as to provide the audio signals. For example the output signals from the microphones 203 may be filtered or equalized or have any other suitable processing performed on them.

The one or more audio signals that are obtained may comprise audio captured by spatially distributed microphones 203 so that a spatial audio signal can be provided to a user. The spatial audio signals could be a stereo signal, binaural signal, Ambisonic signal or any other suitable type of spatial audio signal.

The method also comprises, at block 303, dividing the obtained one or more audio signals into a plurality of intervals. Any suitable process may be used to divide the obtained one or more audio signals into the intervals. The intervals could be time-frequency intervals, time intervals or any other suitable type of intervals.

In some examples the intervals could be different sizes. For instance, where the intervals comprise time-frequency intervals, the frequency bands that are used to define the time-frequency intervals could have different sizes for different frequencies. For example, the lower frequency intervals could cover smaller frequency bands than the higher frequency intervals.

At block 305 the method comprises determining one or more parameters relating to one or more noise characteristics for different intervals. In some examples the parameters may be determined for each of the intervals. In other examples the parameters could be determined for just a subset of the intervals.

In some examples the one or more parameters relating to one or more noise characteristics may provide an indication of whether or not noise is present in the different intervals. In other examples the method could comprise determining whether or not noise is present and then, if noise is present, determining one or more parameters relating to one or more noise characteristics of the determined noise for different intervals.

In some examples the one or more parameters relating to one or more noise characteristics may be determined at the same time as noise presence is determined. In other examples the noise presence could be determined separately to the one or more parameters relating to one or more noise characteristics.

In some examples the one or more parameters relating to one or more noise characteristics could be a noise presence parameter which could be a binary variable with values equivalent to noise or no noise. A value of no noise could be a level where the only noise present is not perceptible to a user. In other examples the noise presence could have a range of values. In some examples the noise presence variable values may be relative to signal energy. The one or more parameters relating to noise characteristics may provide a ratio or an energy value indicating the amount of external sounds in the captured audio signal at different intervals, in which case the remaining energy may assumed to be noise.

The noise characteristics that are analysed relate to noise that is detected by one or more of the plurality of microphones 203 that capture the audio for the audio signals. The noise may be unwanted sounds in the audio signals that are captured by the microphones 203. The noise may comprise noise that does not correspond to a sound field captured by the plurality of microphones 203. For example the noise could be wind noise, handling noise or any other suitable type of noise. In some examples the noise could comprise noise that is caused by other components of the electronic device 201. For example the noise could comprise noises caused by focussing cameras within the electronic device 201. The noise characteristics that are analysed could exclude noise that is introduced by the microphones 203.

In some examples the one or more parameters relating to noise characteristics could comprise an energetic ratio parameter that determines the proportions of the external sounds at the captured audio signal, which may comprise external sounds and the noise.

In some examples the one or more parameters relating to noise characteristics could comprise an estimate of the energy that is from the external sound sources. If the energy from the external sound sources is known, the remainder of the signal energy can be considered noise.

The one or more parameters relating to one or more noise characteristics may comprise any parameters which provide an indication of the noise level and/or method of noise reduction that will improve audio quality for the interval being analysed.

In some examples the one or more parameters relating to noise characteristics could comprise noise level in an interval. The noise level could be determined by monitoring signal level differences between frequency bands, monitoring correlations between audio captured by the different microphones 203 or any other suitable method.

In some examples the noise levels in intervals preceding an analysed interval can be monitored. For instance, to determine noise levels in a given frequency band the noise in a preceding time period can be determined. The probability of the noise level changing significantly within the next interval can then be predicted based on the noise levels in the previous intervals. This can therefore take into account the fact that a single interval might show a small amount of noise but this could be an anomaly in an otherwise noisy time period.

In some examples the one or more parameters relating to noise characteristics could comprise parameters relating to the methods of noise reduction that are currently being used or that have previously been used. In such examples the one or more parameters could comprise the methods of noise reduction used for a previous time interval in a frequency band, the duration for which a current method of noise reduction has been used or any other suitable parameter.

The use of parameters relating to the methods of noise reduction may enable the frequency at which switching between different types of noise reduction methods occurs. This may reduce artefacts caused by switching between the different types of noise reduction and so may increase the perceived audio quality for the user.

Other types of parameters relating to noise characteristics could also be used in other examples of the disclosure. For instance, in some examples the orientation of microphones 203 that capture the audio or any other suitable parameter could be used. The orientation of the microphones may give an indication of effects such as shadowing which can affect the levels at which microphones capture audio from different directions and so affects detection of noise captured by the microphones.

The parameters relating to noise characteristics may be determined independently for the different intervals. For example the analysis that is performed for a first interval could be independent of the analysis that is performed for a second interval. This may mean that the analysis and determination that are made for a first interval do not affect the analysis and determination that are made for a second interval.

In some examples determining one or more parameters relating to noise characteristics comprises determining whether or not the one or more parameters are within a threshold range. Determining if a parameter is within a threshold range may comprise determining if a value of the parameter is above or below a threshold value. In some examples determining if a parameter is within a threshold range may comprise determining if a value of the parameter is between an upper value and a lower value.

The values of the thresholds may be different for different intervals. For example different thresholds for the one or more parameters relating to noise characteristics may be used for different frequency ranges within a plurality of time-frequency intervals. This could take into account the fact that different frequency bands may be more affected by noise than other frequency bands. For instance wind noise may be more perceptible in the lower frequency bands than the higher frequency bands. Also switching between different methods of noise reduction may be more perceptible to the user at higher frequency bands because there is a higher phase difference. The level difference may also be higher at higher frequency bands because of the effect of acoustic shadowing by the electronic device 201 is larger for the higher frequency bands. This may make it undesirable to switch between different methods of noise reduction too frequently for the higher frequency bands. Therefore, in examples of the disclosure different thresholds for the time period between switching could be used for different frequency bands.

At block 307 the method comprises controlling noise reduction applied to the different intervals based on the determined one or more parameters within the different time-frequency intervals.

Controlling the noise reduction applied to an interval may comprise using the determined parameters to select a method of noise reduction that is to be applied to an interval. The selection of the method of noise reduction may be based on whether or not a parameter relating to noise characteristics is determined to be within a threshold range.

The method of noise reduction could comprise any process which reduces the amount of noise in an interval. In some examples the method of noise reduction could comprise one or more of; providing a noise reduced spatial output, providing a spatial output with no noise reduction, providing a noise reduced mono audio output, providing a beamformed output, providing a noise reduced beamformed output. The types of noise reduction that are available may depend on the types of spatial audio available, the types of microphones 203 used to capture the audio, the noise levels and any other suitable factor.

In examples of the disclosure the parameters relating to noise characteristics are determined differently for the different intervals. This may enable different methods of noise reduction to be used for the different intervals. This enables different frequency bands to use different types of noise reduction at the same time. So for example a first type of noise reduction could be applied to a first frequency band, while at the same time, a second type of noise reduction could be applied to a second frequency band. This may enable the noise reduction applied to a first interval to be independent of the noise reduction applied to a second wherein the first and second intervals have different frequencies but overlapping times.

In some examples controlling the noise reduction applied to an interval may comprise determining when to switch between different methods used for noise reduction within one or more intervals. In such examples two or more different methods of noise reduction may be available and the apparatus 101 may use the method shown in FIG. 3 to determine when to switch between the different methods. The method may enable different time intervals for switching to be used for different frequency bands. For instance switching between different methods of noise reduction may be more perceptible to the user at higher frequency bands because there is larger phase difference in these bands and so a longer time period between switching between the different methods of noise reduction may be used for the higher frequency bands than for the lower frequency bands.

FIG. 4 illustrates another example method of controlling noise reduction. The method may be implemented using an apparatus 101 as shown in FIG. 1 and/or an electronic device 201 as shown in FIG. 2.

At block 401 a plurality of audio signals are obtained. The audio signals may comprise audio obtained from a plurality of microphones 203. The plurality of microphones 203 may be spatially distributed so as to enable a spatial audio signal to be provided.

At blocks 403 and 405 the obtained audio signals are divided into a plurality of intervals. In the example of FIG. 4 the audio signals are divided into a plurality of time-frequency intervals. These time-frequency intervals may also be referred to as the time-frequency tiles. At block 403 the audio signals are divided into time intervals. Once the audio signals have been divided into time intervals the time intervals are converted into the frequency domain. The time to frequency domain conversion of a time interval may use more than one time interval. For example, the short-time Fourier transform (STFT) may use the current and the previous time interval, and performs the transform using an analysis window (over the two time intervals) and a fast Fourier transform (FFT). Other conversions may use other than exactly two time intervals. At block 405 the frequency domain signal is grouped into frequency sub-bands. The sub-bands in the different time frames now provide a plurality of time-frequency intervals.

At block 407 it is estimated whether or not noise is present within the different time-frequency intervals. The noise could be wind noise, handling noise or any other unwanted noise that might be captured by the plurality of microphones 203.

Any suitable process can be used to estimate whether or not noise is present. In some examples the difference in signal levels between different microphones 203 for different frequency bands may be used to determine whether or not noise is present within the different time-frequency intervals. If there is a large signal difference between frequency bands then it may be estimated that there is noise in the louder signal.

In some examples correlation between microphones 203 could be used to estimate whether or not noise is present in a time-frequency interval. This could be in addition to, or instead of, comparing the different signal levels.

In such examples the plurality of microphones 203 provide signals $x_m(n')$, where m is the microphone index and n' is the sample index. In this example the time interval is N samples long, and n denotes the time interval index of a frequency transformed signal. When estimating if noise is present the processor 105 is configured for, time interval index n, to apply a sinusoidal window on each input from the different microphones 203 for sample indices $n'=(n-1)N, \ldots, (n+1)N-1$, and transform these windowed input signal sequences into the frequency domain by Fourier transform. This results in the frequency-transformed signal $X_m(k, n)$, where k is the frequency bin index. This procedure is known as a short time Fourier transform. The frequency domain representation is grouped into B sub-bands with indices $b=0, \ldots, B-1$, where each sub-band has a lowest bin $k_{b,low}$ and the highest bin $k_{b,high}$, and includes also the bins in between.

For the lower frequency bands the distance between the microphones 203 is short compared to the wavelength of sound in the frequency band. For such frequency bands a high power estimate of the signal from a first microphone 203A, $$E_1(b,n)=\sum_{k=k_{b,low}}^{k_{b,high}}|X_1(k,n)|^2$$

compared to the cross-correlation estimate between a first microphone 203A and a second microphone 203B.

$$C_{1,2}(b,n)=\sum_{k=k_{b,low}}^{k_{b,high}}|X_1(k,n)X_2^*(k,n)|,$$

indicates that there is noise in the signal from the first microphone 203A.

The process of determining whether or not noise is present may also take into account other factors that could affect the differences in signal levels. For instance the body of an electronic device 201 will shadow audio so that audio coming from a source to an electronic device 201 is louder in the microphones 203 that are on the same side as the source and audio is attenuated by the shadowing of the electronic device 201 in microphones 203 on other sides. This shadowing effect is bigger at higher frequencies and signal level differences caused by shadowing need to be taken into account when estimating whether or not noise is present. This may mean that different thresholds in the signal levels are used for different frequency bands to estimate whether or not noise is present. For example there may be higher thresholds for higher frequency bands so that a larger difference between signal levels must be detected before it is estimated that noise is present as compared to the lower frequency bands.

At block 409 it is determined whether or not noise reduction was used in the previous time-frequency interval. The previous time-frequency interval may be the time-frequency interval that immediately precedes a previous time-frequency interval in a given frequency band.

If noise reduction was used then at block 411 it is determined whether or not noise reduction is needed for the current previous time-frequency interval that is being analysed. For example it may be determined whether or not the noise level in the time-frequency interval is low enough so that noise reduction is not needed. This could be determined by determining whether or not the noise level is above or below a threshold value.

In some examples determining whether or not noise reduction is needed could comprise determining the number of microphones 203 that have provided a signal with a low level of noise. For instance, if there are two or more microphones 203 that have low noise levels this may enable a sufficiently high quality signal to be provided without applying noise reduction.

For example if the microphone signal with the least noise and the microphone signal with the next least noise do not differ by more than the effects expected from shadowing then it can be estimated that these two signals comprise a low enough noise level such that noise reduction is not needed. These two low noise microphone signals could be used to create a spatial audio signal.

The shadowing may be dependent upon the arrangement of the microphones 203 and the frequency of the captured sound. In some examples the shadowing may be determined experimentally, for example by playing audio to an electronic device 201 from different directions in an anechoic chamber. In some examples the expected energy differences between a signal obtained by a first microphone 203A and a signal obtained by a second microphone 203B can be estimated using the table lookup equation:

$$\text{Shadow}AB=ShdAB(\text{direction})*\text{ratio}.$$

For highly directional sounds the ratio increases towards one and for weakly correlating inputs the ratio decreases towards zero. The table ShdAB values can be determined by laboratory measurements or by any other suitable method.

In other examples a different value could be used as a threshold for determining if noise reduction is needed. This different value could be used instead of, or in addition to, the effects expected from shadowing. Other values that could be used comprise any one or more of: a frequency dependent but signal independent fixed threshold that is tuned for an electronic device 201 based on tests, correlation based measures that take into account that microphone signals become naturally less correlated at high frequencies and in the presence of wind noise, maximum phase shift between microphone signals where the maximum phase shift depends on frequency and microphone distance or any other suitable value.

In other examples determining whether or not noise reduction is needed could comprise determining whether a cross correlation between microphone signals is above a threshold. This could be used for low frequencies where the wavelength of the captured sound is long with respect to the spacing between the microphones 203. In such examples the cross-correlation between signals captured by a pair of microphones 203 can be normalized with respect to the microphone energies so as to produce a normalized cross-correlation value between 0 and 1, where 0 indicates orthogonal signals and 1 indicates a fully correlated signal. When the normalized cross-correlation is above a threshold such as 0.8 then it can be indicated that the level of noise captured by the pair of microphones 203 is low enough so that noise reduction is not needed.

If, at block 411 it is determined that noise reduction is needed then, at block 413 it is determined whether the current method of noise reduction that is needed is the same as the method used in the previous time-frequency interval. This may comprise determining if the best method for noise reduction for a time-frequency interval is the same as the method used for a previous time-frequency interval. For example it may be determined if the same microphone signals were used for the method of noise reduction in the previous time-frequency interval. This could be achieved by checking if the microphones 203 that provide the lowest noise signals are the same as the microphones 203 that provided the lowest noise signals for the previous time-frequency intervals.

If, at block 413, it is determined that the method of noise reduction is not the same, then at block 415 it is determined whether or not the noise reduction time limit is exceeded. That is, it is determined whether or not the same method of noise reduction has been used for a time period that exceeds a threshold. Different time periods may be used for the thresholds in different frequency bands.

The threshold for the time period may be selected by estimating whether switching to a different method of noise reduction will cause more perceptual artefacts than the noise that would be left in if the switch was not made. In examples where the noise reduction methods comprise switching between different microphones this estimate could be made from the following equation:

$$prevenergy - currentenergy - \frac{\text{maxphase}}{180} * w_{phase} - \left(1 - \frac{\text{time}}{\text{time}_{TH}}\right) * w_{time} > \text{shadow} + \text{safety}$$

where:

- prevenergy is the energy within the current time-frequency interval of the microphone 203 that was used in the previous time-frequency interval
- currentenergy is the energy of the current time-frequency interval for the microphones 203 with least noise
- maxphase is the maximum phase shift that can occur when switching from the microphone 203 used in the previous time-frequency interval to the microphone 203 that currently has the least noise. This phase takes into account distances between the microphones 203 and the frequency band of the time-frequency interval. For frequencies where half the wavelength of the sound is larger than the distance between microphones 203 this is maximum phase shift 180°,
- $w_{phase}$ is a weighting factor,
- time is the minimum of how long ago in seconds last switch occurred and a threshold time $\text{time}_{TH}$. The threshold time is selected so that switches between different microphones 203 will not occur every time the lowest noise microphone 203 changes. The threshold time could be between 10 to 100 ms or within any other suitable range.
- $w_{time}$ is a weighting factor,
- shadow is the maximum acoustic shadowing caused by the electronic device 201,
- safety is a constant that estimates errors in the estimates and slows down switching based on erroneous estimates, The values in the equation may be calculated for single microphones 203 or for the plurality of microphones 203. Where the values are calculated for the plurality of microphones 203 average values may be used for the terms in the equation.

If the time limit is not exceeded then, at block 417 the method of noise reduction that was used for the previous time-frequency interval is applied to the current time-frequency interval. That is there would be no switch in the method of noise reduction used so as to avoid artefacts being perceived by the user.

If the time limit is exceeded then, at block 419 the best method of noise reduction for the current time-frequency interval is selected and applied to the current time-frequency interval. In such examples it may have been determined that the switch between the different methods of noise reduction will cause less artefacts than the noise within the audio signal.

If at block 413 it is determined that the current best method of noise reduction is the same as the method used in the previous time-frequency interval then the method proceeds to block 419 and the best method of noise reduction for the current time-frequency interval is selected and applied to the current time-frequency interval. In this situation there would be no switching between the different types of noise reduction.

If at block 411 it is determined that noise reduction is not needed then, at block 421 it is determined if a switching threshold is exceeded. It may be determined if a switching from applying noise reduction to applying no noise reduction will cause more perceptual artefacts than applying the noise reduction. The threshold could be a comparison between the estimated noise levels in the time-frequency interval and the estimated artefacts caused by the switch.

If the threshold is not exceeded then the method will proceed to block 413 and the process described in blocks 413, 415, 417 and 419 is followed. If it is determined to apply the best noise reduction in this circumstance this would be applying no noise reduction for this circumstance.

If at block 421 it is determined that the threshold is not exceeded then at block 423 the noise reduction is controlled so that no noise reduction is applied to the time-frequency interval. This can be applied without having to follow the process of blocks 413, 415 and 419.

If at block 409 it was determined that noise reduction was not used in the previous time-frequency interval then the method moves to block 425. At block 425 it is determined whether or not noise reduction is needed. The process used at block 425 may be the same as the process used at block 411.

If at block 425 it is determined that noise reduction is needed then the process moves to block 427. At block 427 it is determined whether or not switching threshold is exceeded. It may be determined that switching from applying no noise reduction to applying noise reduction will cause more perceptual artefacts than applying the noise reduction that is not needed. The threshold could be a comparison between the estimated noise levels in the time-frequency interval and the estimated artefacts caused by the switch.

In some examples the switch threshold could be a fixed time limit that must have passed since the last switch between different methods of noise reduction. The time limit could be 0.1 seconds or any other suitable time limit. In other examples the time limit could be estimated based on the different signal levels and the artifacts caused by the switching. In some examples different time limits could be used for the different frequency bands.

The switch threshold for switching from applying no noise reduction to applying some noise reduction may be a shorter time limit than the switch threshold for switching from applying some noise reduction to applying no noise reduction. This is because noise may occur abruptly and so it is beneficial to enable the noise reduction to be switched on more quickly than it is be switched off quickly.

If the switch threshold is not exceeded then the process moves to block 423 and no noise reduction is applied to the current time-frequency interval. In this case there is no switching between different methods of noise reduction as this is considered to provide a lower quality signal than the noise itself.

If the switch threshold is exceeded then sufficient time has passed since the last switch in noise reduction method and the process moves to block 429. At block 429 noise reduction is applied to the current time-frequency interval. The noise reduction that is applied could be the noise reduction that has been determined to be best for the noise level within the current noise-frequency interval.

If at block 425 it is determined that no noise reduction is needed then the process moves to block 431 and no noise reduction is applied to the current time-frequency interval.

Once the noise reduction has been applied or not applied as determined by the process shown in FIG. 4 the method moves to block 433 and the time-frequency interval is converted back to the time domain. The time domain signal can then be stored in the memory 107 and/or provided to a rendering device for rendering to a user.

It is to be appreciated that blocks 407 to 433 would be repeated as needed for individual time-frequency intervals. In some examples the method could be repeated for every time-frequency interval. In some examples the method could be repeated for just a sub-set of the time-frequency intervals.

Examples of the methods shown in FIGS. 3 and 4 provide the advantage that it enables different noise reduction methods to be used for different frequency bands. The method also allows for using different criteria to determine when to switch between different noise reduction methods for the different frequency bands. Therefore this provides for an improved quality audio signal with reduced noise levels.

Figure 5:
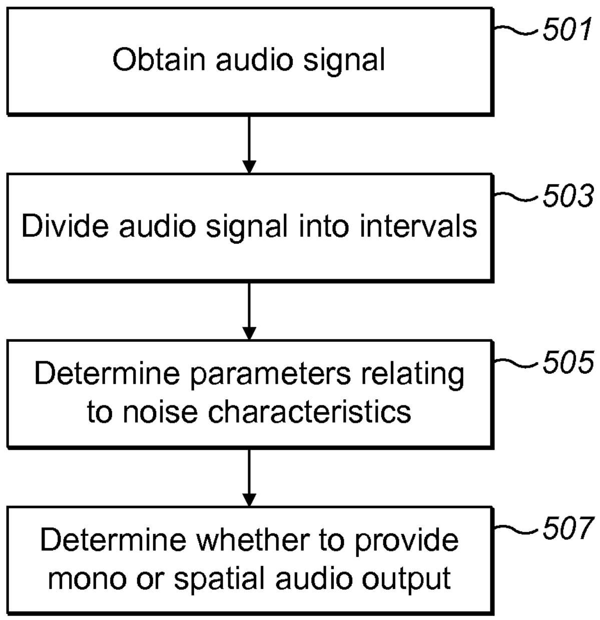
FIG. 5 illustrates another example method.

FIG. 5 illustrates another example method of controlling noise reduction. The method may be implemented using an apparatus 101 as shown in FIG. 1 and/or an electronic device 201 as shown in FIG. 2.

The method comprises, at block 501, obtaining one or more audio signals wherein the one or more audio signals represent sound signals captured by a plurality of microphones 203. In some examples the one or more audio signals comprises audio obtained from microphones 203 that are provided within the same electronic device 201 as the apparatus 101. In other examples the one or more audio signals comprise audio obtained from microphones 203 that are provided in one or more separate devices. In such examples the one or more audio signals could be transmitted to the apparatus 101.

The audio signals that are obtained may comprise an electrical signal that represents at least some of a sound field captured by the plurality of microphones 203. The output signals provided by the microphones 203 may be modified so as to provide the audio signals. For example the output signals from the microphones 203 may be filtered or equalized or have any other suitable processing performed on them.

The audio signals that are obtained may be captured by spatially distributed microphones 203 so that a spatial audio signal can be provided to a user. The spatial audio signals could be a stereo signal, binaural signal, Ambisonic signal or any other suitable type of spatial audio signal.

The method also comprises, at block 503, dividing the obtained one or more audio signals into a plurality of intervals. Any suitable process may be used to divide the obtained one or more audio signals into the intervals. The intervals could be time-frequency intervals, time intervals or any other suitable type of intervals.

In some examples the intervals could be different sizes. For instance the frequency bands that are used to define the intervals could have different sizes for different frequencies. For example, the lower frequency intervals could cover smaller frequency bands than the higher frequency intervals.

At block 505 the method comprises determining one or more parameters relating to one or more noise characteristics for different intervals. In some examples the parameters may be determined for each of the intervals. In other examples the parameters could be determined for just a subset of the intervals.

The noise characteristics that are analysed relate to noise that is detected by one or more of the plurality of microphones 203 that capture the audio for the one or more audio signals. The noise may be unwanted sounds in the audio signals that are captured by the microphones 203. The noise may comprise noise that does not correspond to a sound field captured by the plurality of microphones 203. For example the noise could be wind noise, handling noise or any other suitable type of noise. In some examples the noise could comprise noise that is caused by other components of the electronic device 201. For example the noise could comprise noises caused by focussing cameras within the electronic device 201. The noise characteristics that are analysed could exclude noise that is introduced by the microphones 203.

The one or more parameters relating to one or more noise characteristics may comprise any parameters which provide an indication of the noise level and/or method of noise reduction that will improve audio quality for the interval being analysed.

In some examples the one or more parameters relating to noise characteristics could comprise noise level in an interval. The noise level could be determined by monitoring signal level differences between frequency bands, monitoring correlations between audio signals captured by the different microphones 203 or any other suitable method.

In some examples the noise levels in intervals preceding an analysed interval can be monitored. For instance, to determine noise levels in a given frequency band the noise in a preceding time period can be determined. The probability of the noise level changing significantly within the next interval can then be predicted based on the noise levels in the previous intervals. This can therefore take into account the fact that a single interval might show a small amount of noise but this could be an anomaly in an otherwise noisy time period.

In some examples the one or more parameters relating to noise characteristics could comprise parameters relating to the methods of noise reduction that are currently being used or that have previously been used. In such examples the one or more parameters could comprise the methods of noise reduction used for a previous time interval in a frequency band, the duration for which a current method of noise reduction has been used or any other suitable parameter.

The use of parameters relating to the methods of noise reduction may enable the frequency at which switching between different types of noise reduction methods occurs. This may reduce artefacts caused by switching between the different types of noise reduction and so may increase the perceived audio quality for the user.

Other types of parameters relating to noise levels could also be used in other examples of the disclosure. For instance, in some examples the orientation of microphones 203 that capture the audio signals or any other suitable parameter could be used. The orientation of the microphones may give an indication of effects such as shadowing which can affect the levels at which microphones capture audio from different directions and so affects noise captured by the microphones.

The parameters relating to noise characteristics may be determined independently for the intervals. For example the analysis that is performed for a first interval could be independent of the analysis that is performed for a second interval. This may mean that the analysis and determination that are made for a first interval do not affect the analysis and determination that are made for a second interval.

In some examples determining one or more parameters relating to noise characteristics comprises determining whether or not the one or more parameters are within a threshold range. Determining if a parameter is within a threshold range may comprise determining if a value of the parameter is above or below a threshold value. In some examples determining if a parameter is within a threshold range may comprise determining if a value of the parameter is between and upper value and a lower value.

The values of the thresholds may be different for different intervals. For example different thresholds for the one or more parameters relating to noise characteristics may be used for different frequency ranges within the plurality of intervals. This could take into account the fact that different frequency bands may be more affected by noise than other frequency bands.

For instance wind noise may be more perceptible in the lower frequency bands than the higher frequency bands. Also switching between different methods of noise reduction may be more perceptible to the user at higher frequency bands. This may make it undesirable to switch between different methods of noise reduction too frequently for the higher frequency bands. Therefore, in examples of the disclosure different thresholds for the time period between switching could be used for different frequency bands.

At block 507 the method comprises determining whether to provide mono audio output or spatial audio output based on the determined one or more parameters. The mono audio output could comprise an audio signal comprising audio from two or more channels where the audio signal is substantially the same for each channel.

The mono audio output may be more robust than the spatial audio output and so may provide a reduced level of noise. Providing a mono audio output instead of a spatial audio output may therefore provide a reduced noise output for the audio signal.

In some examples if it is determined to provide a mono audio output then the microphone signal that has the least noise may be determined so that this can be used to provide the mono audio output. In some examples the mono audio output could be provided by combining two or more microphone signals from the plurality of microphones 203. In such examples the microphones 203 may be located close to each other. For example microphones 203 may be located at the same end of an electronic device.

In examples of the disclosure the different parameters may be determined differently for the different frequency bands within the plurality of intervals. In such examples this may enable a mono audio output to be provided for a first frequency band while a spatial audio output can be provided for a second frequency band. This enables the mono audio output to be provided for a first frequency band within the intervals while the spatial audio output is provided for a second frequency band within the intervals wherein the first and second intervals have different frequencies but overlapping times.

Figure 6:
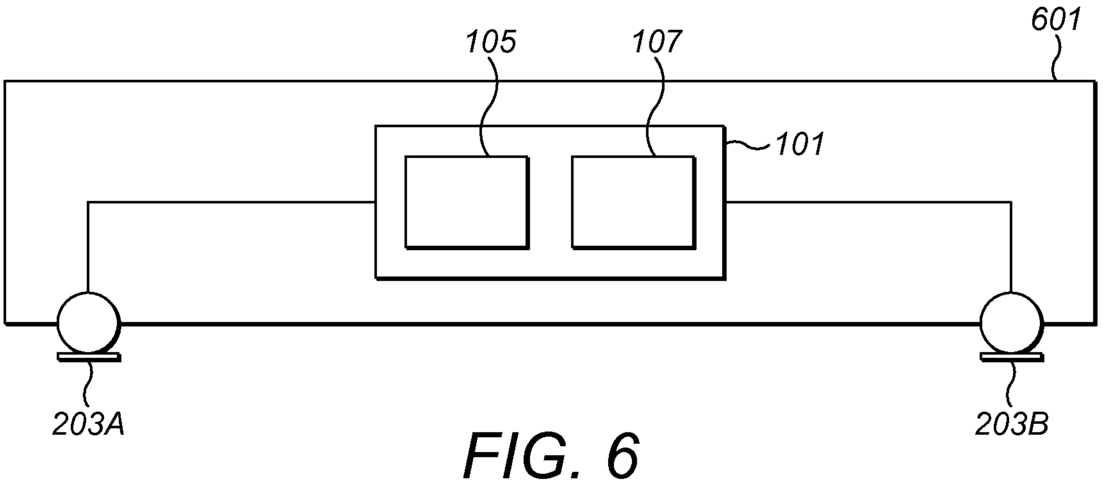
FIG. 6 illustrates another example electronic device.

FIG. 6 illustrates another example electronic device 601. The example electronic device 601 could be used to implement the methods shown in FIGS. 5 and 7. In some examples the electronic device 601 could also implement the methods shown in FIGS. 3 and 4. It is also to be appreciated that other electronic devices such as the electronic device 201 shown in FIG. 2 could be used to implement the methods shown in FIGS. 5 and 7.

The example electronic device 601 of FIG. 6 comprises an apparatus 101 which may be as shown in FIG. 1. The apparatus 101 may comprise a processor 105 and memory 107 as described above. The example electronic device also comprises a plurality of microphones 203. In the example of 601 of FIG. 6 the electronic device 601 comprises two microphones The electronic device 601 could be a communications device such as a mobile phone. It is to be appreciated that the communications device could comprise components that are not shown in FIG. 6 for examples the communications devices could comprise one or more transceivers which enable wireless communication.

In some examples the electronic device 601 could be an image capturing device. In such examples the electronic device 601 could comprise one or more cameras which may enable images to be captured. The images could be video images, still images or any other suitable type of images. The images that are captured by the camera module may accompany the sound signals that are captured by the plurality of microphones 203.

The plurality of microphones 203 may comprise any means which are configured to capture sound and enable one or more audio signals to be provided. The one or more audio signals may comprise an electrical signal that represents at least some of the sound field captured by the plurality of microphones 203. The output signals provided by the microphones 203 may be modified so as to provide the audio signals. For example the output signals from the microphones 203 may be filtered or equalized or have any other suitable processing performed on them.

The electronic device 601 is configured so that the audio signals comprising audio from the plurality of microphones 203 are provided to the apparatus 101. This enables the apparatus 101 to process the audio signals. In some examples it may enable the apparatus 101 to process the audio signals so as to reduce the effects of noise captured by the microphones 203.

The plurality of microphones 203 may be positioned within the electronic device 601 so as to enable spatial audio to be captured. For example the positions of the plurality of microphones 203 may be distributed through the electronic device 601 so as to enable spatial audio to be captured. The spatial audio comprises an audio signal which can be rendered so that a user of the electronic device 601 can perceive spatial properties of the audio signal. For example the spatial audio may be rendered so that a user can perceive the direction of origin and the distance from an audio source.

In the example shown in FIG. 6 the electronic device 601 comprises two microphones 203. A first microphone 203A is provided at a first end on a first surface of the electronic device 601. A second microphone 203B is provided at a second end of the electronic device 601. The second end is an opposite end of the electronic device 601 to the first end. The second microphone 203B is provided on the same surface as the first microphone 203A. It is to be appreciated that other configurations of the plurality of microphones 203 may be provided in other examples of the disclosure.

The plurality of microphones 203 are coupled to the apparatus 101. This may enable the audio signals that are captured by the plurality of microphones 203 to be provided to the apparatus 101. This may enable the audio signals to be stored in the memory 107. This may also enable the processor 105 to perform noise reduction on the obtained audio signals. Example methods for noise reduction are shown in FIGS. 5 and 7.

In the example shown in FIG. 6 the microphones 203 that capture the audio and the processor 105 that performs the noise reduction are provided within the same electronic device 601. In other examples the microphones 203 and the processor 105 that performs noise reduction could be provided in different electronic devices 601. For instance the audio signals could be transmitted from the plurality of microphones 203 to a processing device via a wireless connection, or some other suitable communication link.

Figure 7:
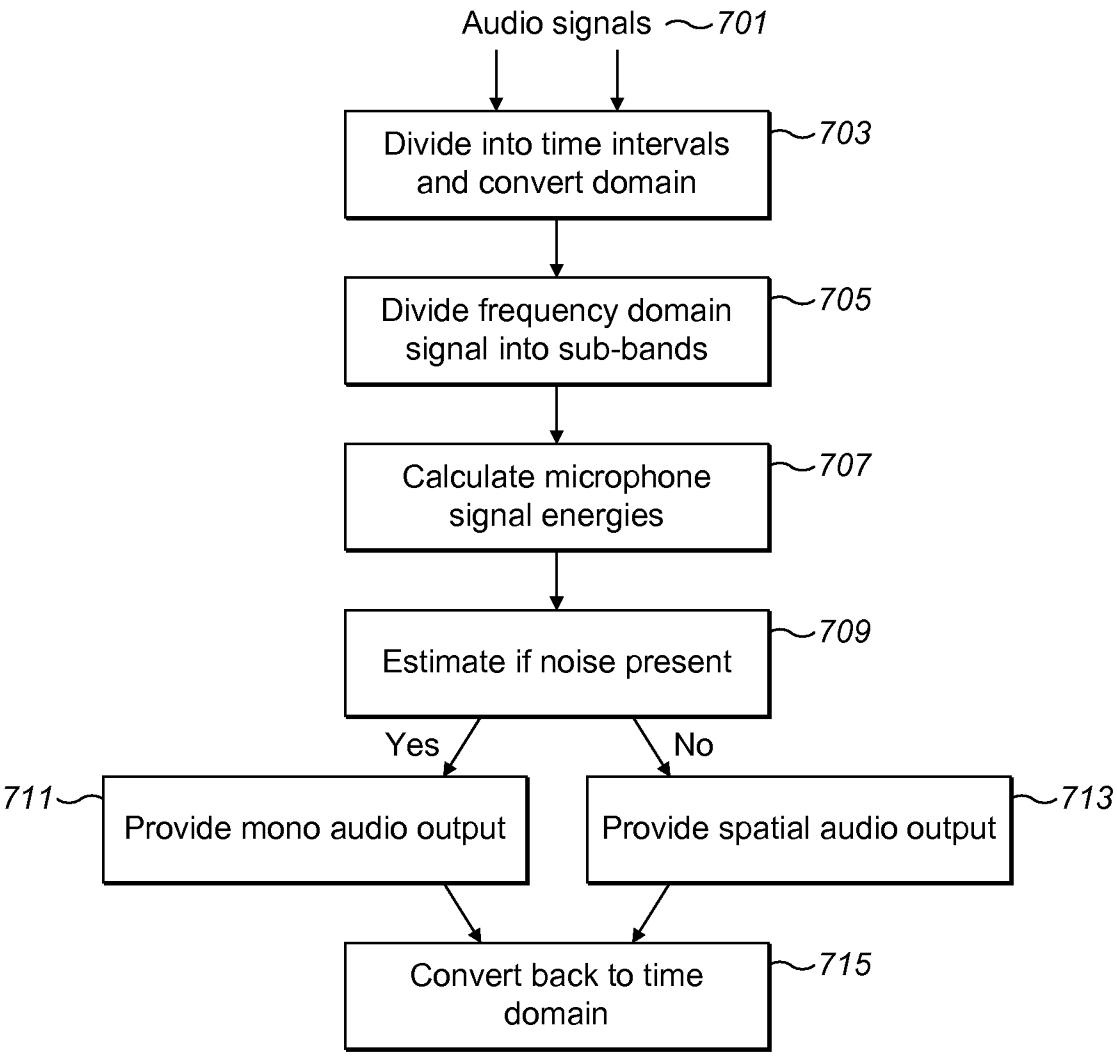
FIG. 7 illustrates another example method.

FIG. 7 illustrates another example method of controlling noise reduction. The method may be implemented using an apparatus 101 as shown in FIG. 1 and/or an electronic device 601 as shown in FIG. 6.

At block 701 a plurality of audio signals are obtained. The audio signals may comprise audio obtained from a plurality of microphones 203. The plurality of microphones 203 may be spatially distributed so as to enable a spatial audio signal to be provided. In the example of FIG. 7 two audio signals are obtained.

At blocks 703 and 705 the obtained audio signals are divided into a plurality of intervals. In the example of FIG. 7 the audio signals are divided into a plurality of time-frequency intervals. These time-frequency intervals may also be referred to as the time-frequency tiles. At block 703 the audio signals are divided into time intervals. Once the audio signals have been divided into time intervals the time intervals are converted into the frequency domain. The time to frequency domain conversion of a time interval may use more than one time interval. For example, the short-time Fourier transform (STFT) may use the current and the previous time interval, and performs the transform using an analysis window (over the two time intervals) and a fast Fourier transform (FFT). Other conversions may use other than exactly two time intervals. At block 705 the frequency domain signal is grouped into frequency sub-bands. The sub-bands in the different time frames now provide a plurality of time-frequency intervals.

At block 707 the microphone signal energies are calculated for the different time-frequency intervals. Once the microphone signal energies have been calculated the energies for different time-frequency intervals may be compared.

At block 709 it is estimated whether or not noise is present in the time-frequency intervals. The noise could be wind noise, handling noise or any other unwanted noise that might be captured by the plurality of microphones 203.

Any suitable process can be used to estimate whether or not noise is present. In some examples the comparison of the energies for the different time-frequency intervals may be used to determine whether or not noise is present. If there is a large energy difference between frequency bands then it may be estimated that there is noise in the louder signal.

The process of determining whether or not noise is present may take into account factors that could affect the differences in signal levels such as shadowing. For instance the body of an electronic device 601 will shadow audio so that audio coming from a source to an electronic device 601 is louder in the microphones 203 that are on the same side as the source and audio is attenuated by the shadowing of the electronic device 601 in microphones 203 on other sides. This shadowing effect is bigger at higher frequencies and signal level differences caused by shadowing need to be taken into account when estimating whether or not noise is present. This may mean that different thresholds for differences in the signal levels are used for different frequency bands to estimate whether or not noise is present. For example there may be higher thresholds for higher frequency bands so that a larger difference between signal levels must be detected before it is estimated that noise is present as compared to the lower frequency bands.

In other examples other methods for determining whether or not noise is present could be used instead. For example, a cross correlation of energies in different time-frequency intervals could be used.

The threshold that is applied to determine whether or not noise is present within a time-frequency interval may be different for different frequency bands within the plurality of time-frequency intervals. The threshold is selected so that the apparatus 101 is more likely to use mono audio output for the low frequency bands than for the high frequency bands. For instance a higher threshold for the signal difference may be used for the higher frequencies than the lower frequencies. In some examples the threshold could be 10 dB for low frequency bands and 15 dB for high frequency bands. In other examples the threshold could be 5 dB for low frequency bands and 10 dB for high frequency bands. It is to be appreciated that other values for the thresholds could be used in other examples of the disclosure. This takes into account the fact that the lower frequency bands are more susceptible to noise than the higher frequency bands. This may also take into account the fact that it may be harder to accurately detect the presence of noise in the higher frequency bands.

If at block 709 it is estimated that there is noise present then the method moves to block 711. At block 711 the microphone signal with the least noise is used to provide a mono audio output. In some examples there may be two or more microphones 203 that provide a signal with low noise. However if these microphones 203 are located close together, for example if they are located at the same end of an electronic device 601 than the two microphone signals can be combined to provide a mono audio output. The microphone signals could be combined by summing or using any other suitable method.

If at block 709 it is estimated that there is no noise present, or if the estimated noise present is below a threshold value, then the method moves to block 713. At block 713 two or more microphone signals are used to provide a spatial audio output. The spatial audio output could be a stereo signal, a binaural signal an Ambisonic signal or any other suitable spatial audio output. It is to be appreciated that any suitable process could be used to generate the spatial audio output from the obtained audio signals.

Once the mono audio output or the spatial audio output is provided as determined by the process shown in FIG. 7 the method moves to block 715 and the time-frequency interval is converted back to the time domain. The time domain signal can then be stored in the memory 107 and/or provided to a rendering device for rendering to a user.

It is to be appreciated that blocks 707 to 714 would be repeated as needed for individual time-frequency intervals. In some examples the method could be repeated for every time-frequency interval. In some examples the method could be repeated for just a sub-set of the time-frequency intervals.

Examples of the disclosure therefore provided for an audio output signal with an improved noise level by controlling switching between spatial and mono audio outputs for different frequency bands. This takes into account that lower frequency bands are more susceptible to noise than higher frequency bands.

Restricting to mono audio outputs for lower frequencies may also cause fewer perceptible artefacts for a user as humans are less sensitive to the directions of sound for the higher frequencies.

It is to be appreciated that modifications may be made to the example methods and apparatus 101 described above. For instance the effect of noise may be dependent upon the orientation of the electronic device 201, 601 when the audio signals are being captured. This may mean that some microphones 203 are more likely to be affected by noise when the electronic device 201, 601 is used in a first orientation than when the electronic device 201, 601 is used in a second orientation. This information can then be when selecting a method of noise reduction to be used or if selecting between mono audio outputs and spatial audio outputs. For example it may enable different thresholds and/or weighting factors to be applied so as to bias towards the use of microphone signals that are less likely to be effected by noise for a given orientation of the electronic device 201, 601.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory including computer code, the at least one memory and the computer program code configured to, with the at least one processor, cause the apparatus at least to:

obtain one or more audio signals, wherein the one or more audio signals comprise audio captured with a plurality of microphones;

divide the obtained one or more audio signals into a plurality of intervals;

determine one or more parameters relating to one or more noise characteristics for respective ones of the plurality of intervals; and control noise reduction applied to the respective ones of the plurality of intervals based on the determined one or more parameters within the respective ones of the plurality of intervals, wherein controlling the noise reduction applied at least comprises:

determining whether to provide at least partially mono audio output or spatial audio output based on the determined one or more parameters.

2. An apparatus as claimed in claim 1, wherein the plurality of intervals comprise time-frequency intervals.

3. An apparatus as claimed in claim 1, wherein the one or more noise characteristics comprise noise levels.

4. An apparatus as claimed in claim 1, wherein the one or more parameters relating to the one or more noise characteristics are determined independently for the respective ones of the plurality of intervals.

5. An apparatus as claimed in claim 1, wherein the at least one memory and the computer program code are configured to, with the at least one processor, cause the apparatus to:

determine whether or not the one or more parameters are within a threshold range.

6. An apparatus as claimed in claim 5, wherein different thresholds for the one or more parameters relating to the one or more noise characteristics are used for different frequency ranges within the plurality of intervals.

7. An apparatus as claimed in claim 1, wherein the one or more parameters relating to the one or more noise characteristics comprise one or more of:

noise level in an interval;

noise levels in intervals preceding an analysed interval;

methods of noise reduction used for a previous frequency interval;

duration for which a current method of noise reduction has been used within a frequency band; or orientation of the plurality of microphones that capture the one or more audio signals.

8. An apparatus as claimed in claim 1, wherein the noise reduction applied to a first interval is independent of the noise reduction applied to a second interval wherein the first and second intervals have different frequencies but overlapping times.

9. An apparatus as claimed in claim 1, wherein different noise reduction is applied to different intervals where the different intervals have different frequencies and overlapping times.

10. An apparatus as claimed in claim 1, wherein controlling the noise reduction applied to an interval comprises the at least one memory and the computer program code are configured to, with the at least one processor, cause the apparatus to one or more of:

select a method used for noise reduction within the interval;

determine when to switch between different methods used for noise reduction within one or more intervals;

provide a noise reduced spatial output;

provide a spatial output with no noise reduction;

provide a noise reduced mono audio output;

provide a beamformed output; or provide a noise reduced beamformed output.

11. An apparatus as claimed in claim 1, wherein the one or more noise characteristics are associated with one or more of:

noise that has been detected with one or more of the plurality of microphones that capture audio within the one or more audio signals;

wind noise; or handling noises.

12. An apparatus as claimed in claim 1, wherein the at least partially mono audio output comprises two or more channels, wherein audio signals for respective ones of the two or more channels are substantially similar.

13. A method comprising:

obtaining one or more audio signals, wherein the one or more audio signals comprise audio captured with a plurality of microphones;

dividing the obtained one or more audio signals into a plurality of intervals;

determining one or more parameters relating to one or more noise characteristics for respective ones of the plurality of intervals; and controlling noise reduction applied to the respective ones of the plurality of intervals based on the determined one or more parameters within the respective ones of the plurality of intervals, wherein controlling the noise reduction applied at least comprises:

determining whether to provide at least partially mono audio output or spatial audio output based on the determined one or more parameters.

14. A method as claimed in claim 13, wherein the one or more parameters relating to the one or more noise characteristics are determined independently for the respective ones of the plurality of intervals.

15. An apparatus comprising:

at least one processor; and at least one memory including computer program code, the at least one memory and the computer program code configured to, with the at least one processor, cause the apparatus at least to:

obtain one or more audio signals, wherein the one or more audio signals comprise audio captured with a plurality of microphones;

divide the obtained one or more audio signals into a plurality of intervals;

determine one or more parameters relating to one or more noise characteristics for respective ones of the plurality of intervals; and determine whether to provide at least partially mono audio output or spatial audio output based on the determined one or more parameters.

16. An apparatus as claimed in claim 15, wherein the plurality of intervals comprise time-frequency intervals.

17. An apparatus as claimed in claim 15, wherein the one or more noise characteristics comprise noise levels.

18. An apparatus as claimed in claim 15, wherein determining to provide the at least partially mono audio output comprises the at least one memory and the computer program code are configured to, with the at least one processor, cause the apparatus to:

determine a microphone signal that has a least amount of noise;

use the determined microphone signal to provide the at least partially mono audio output; and combine microphone signals from two or more of the plurality of microphones, wherein the two or more of the plurality of microphones are located close to each other.

19. An apparatus as claimed in claim 15, wherein determining the one or more parameters relating to the one or more noise characteristics for the different intervals comprises the at least one memory and the computer program code are configured to, with the at least one processor, cause the apparatus to:

determine whether energy differences between microphone signals from different microphones within the plurality of microphones are within a threshold range; and determine whether a switch between the at least partially mono audio output and the spatial audio output has been made within a threshold time.

20. An apparatus as claimed in claim 15, wherein the at least partially mono audio output is provided for a first frequency band within a first interval of the plurality of intervals and the spatial audio output is provided for a second frequency band within a second interval of the plurality of intervals, wherein the first and second intervals have different frequencies but overlapping times.

21. A method comprising:

obtaining one or more audio signals, wherein the one or more audio signals comprise audio captured with a plurality of microphones;

dividing the obtained one or more audio signals into a plurality of intervals;

determining one or more parameters relating to one or more noise characteristics for respective ones of the plurality of intervals; and determining whether to provide at least partially mono audio output or spatial audio output based on the determined one or more parameters.

* * * * *